(12) United States Patent
Heinrich et al.

(10) Patent No.: US 10,834,203 B2
(45) Date of Patent: Nov. 10, 2020

(54) METHOD AND DEVICE FOR ESTABLISHING AN END-TO-END COMMUNICATION BETWEEN TWO NETWORKS

(75) Inventors: Andreas Heinrich, Böblingen (DE); Jörg Heuer, Oberhaching (DE); Sebastian Käbisch, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1300 days.

(21) Appl. No.: 14/238,404

(22) PCT Filed: Jul. 24, 2012

(86) PCT No.: PCT/EP2012/064478
§ 371 (c)(1),
(2), (4) Date: May 27, 2014

(87) PCT Pub. No.: WO2013/020800
PCT Pub. Date: Feb. 14, 2013

(65) Prior Publication Data
US 2014/0325081 A1 Oct. 30, 2014

(30) Foreign Application Priority Data
Aug. 11, 2011 (EP) .................................. 11177218

(51) Int. Cl.
*H04L 29/08* (2006.01)
*H04L 29/06* (2006.01)

(52) U.S. Cl.
CPC ...... *H04L 67/141* (2013.01); *H04L 29/08792* (2013.01); *H04L 67/02* (2013.01);
(Continued)

(58) Field of Classification Search
CPC ......... H04L 67/10; H04L 69/04; H04L 69/22; H04L 29/06142; H04L 29/08792;
(Continued)

(56) References Cited

U.S. PATENT DOCUMENTS 7,032,027 B1 * 4/2006 Meissner ................ H04L 49/90
709/230
7,069,342 B1 6/2006 Biederman
(Continued)

FOREIGN PATENT DOCUMENTS

CN 1929461 A 3/2007
CN 101753626AA 6/2010
(Continued)

OTHER PUBLICATIONS

G. Moritz, D. Timmermann, R. Stoll and F. Golatowski, "Encoding and Compression for the Devices Profile for Web Services," 2010 IEEE 24th International Conference on Advanced Information Networking and Applications Workshops, Perth, WA, 2010, pp. 514-519, doi: 10.1109/WAINA.2010.91. (Year: 2010).*
(Continued)

*Primary Examiner* — Philip J Chea
*Assistant Examiner* — Ruth Solomon
(74) *Attorney, Agent, or Firm* — Lempia Summerfield Katz LLC

(57) ABSTRACT

The invention relates to a method for establishing an end-to-end communication between two networks, wherein: a message is received from one first network, this message having a first header and an application-data part; data of said first header is coded into a second header within the application data part, with the aid of a first coding scheme, so as to produce a modified application data part; said modified application data part is coded with the aid of a
(Continued)

second coding scheme so as to produce a coded message; and this coded message is transmitted to a second network.

12 Claims, 3 Drawing Sheets

(52) U.S. Cl.
CPC ............ *H04L 67/125* (2013.01); *H04L 69/04* (2013.01); *H04L 69/22* (2013.01); *H04L 29/06142* (2013.01); *H04L 69/167* (2013.01)

(58) Field of Classification Search
CPC ..... H04L 67/02; H04L 67/125; H04L 67/141; H04L 69/67
USPC .................. 709/223, 247; 719/310, 313, 330
See application file for complete search history.

(56) References Cited

U.S. PATENT DOCUMENTS

| | | | | |
|---|---|---|---|---|
| 7,738,452 B1* | 6/2010 | O'Rourke | ............ | H04L 47/125 370/389 |
| 7,986,719 B2* | 7/2011 | Elliott | ................... | H04L 69/04 370/392 |
| 8,116,244 B2* | 2/2012 | Agami | ................ | H04W 72/005 370/310 |
| 8,135,868 B2* | 3/2012 | Shelby | ................ | H04L 67/2823 709/203 |
| 8,195,814 B2* | 6/2012 | Shelby | ................... | H04L 67/16 709/228 |
| 8,656,037 B2* | 2/2014 | Itoh | ......................... | H04L 67/02 380/282 |
| 8,751,707 B2* | 6/2014 | Moench | .................. | G06F 9/445 710/63 |
| 9,043,440 B2* | 5/2015 | Leiba | ...................... | H04L 43/50 709/219 |
| 2004/0267710 A1 | 12/2004 | Cotarmanac'h et al. | | |
| 2005/0060431 A1* | 3/2005 | Lewontin | ............ | H04L 67/2823 709/246 |
| 2006/0031126 A1* | 2/2006 | Ma | ..................... | G06Q 30/0601 705/26.1 |
| 2006/0095590 A1* | 5/2006 | Miller | ...................... | H04L 69/04 709/246 |
| 2006/0239298 A1* | 10/2006 | Townsley | ............ | H04L 12/2859 370/470 |
| 2007/0127440 A1* | 6/2007 | Narayanaswami | ..... | H04L 69/04 370/352 |
| 2007/0300240 A1* | 12/2007 | Viegener | ................. | H04L 67/02 719/320 |
| 2008/0117906 A1* | 5/2008 | Xie | ....................... | H04L 65/608 370/392 |
| 2008/0294971 A1* | 11/2008 | Allen | ...................... | H03M 7/30 714/819 |
| 2009/0276451 A1* | 11/2009 | Shelby | ................ | H04L 67/2823 |
| 2010/0020824 A1* | 1/2010 | Elliott | .................... | H04L 69/04 370/474 |
| 2010/0050089 A1 | 2/2010 | Kim et al. | | |
| 2010/0125641 A1* | 5/2010 | Shelby | .................... | H04L 67/16 709/206 |
| 2010/0271976 A1* | 10/2010 | Townsley | ............ | H04L 12/2859 370/254 |
| 2010/0332677 A1* | 12/2010 | Tian | ........................ | H04L 67/16 709/233 |
| 2010/0333151 A1* | 12/2010 | Huang | ................ | H04N 7/17318 725/94 |
| 2011/0122893 A1* | 5/2011 | Kang | ...................... | H04L 69/04 370/477 |
| 2012/0059868 A1* | 3/2012 | Buckl | ..................... | H04L 69/08 709/201 |
| 2012/0158911 A1* | 6/2012 | Leiba | .................. | H04L 41/5096 709/219 |
| 2012/0198037 A1* | 8/2012 | Shelby | ................ | H04L 41/0253 709/223 |
| 2012/0290749 A1* | 11/2012 | Moench | .................. | G06F 9/445 710/63 |

FOREIGN PATENT DOCUMENTS

| | | | | |
|---|---|---|---|---|
| EP | 1926275 A1 | 5/2008 | | |
| KR | 20040036897 A | 5/2004 | | |
| WO | WO-2011088878 A1 * | 7/2011 | ............ | G06F 9/445 |

OTHER PUBLICATIONS

PCT Search Report and Written Opinion dated Sep. 13, 2012 for corresponding PCT/EP2012/064478 with English translation.
European Search Report dated Feb. 14, 2012 for corresponding EP 11177218.2 with English translation.
Korean Office Action dated Dec. 23, 2014 for corresponding Korean Patent Application No. 10-2014-7006507 with English translation.
Hypertext Transfer Protocol—HTTP/1.1, http://tools.ietf.org/html/rfc2616, pp. 1-178, 1999.
Information Technology—MPEG Systems Technologies—Part 1: Binary MPEG format for XML, ISO/IEC FDIS 23001- 1:2005(E), ISO/IEC JTC 1/SC 29/WG 11, pp. 1-142, 2005.
B. Frank, Compressed HTTP Over PANs, http://tools.ietf.org/pdf/draft-frank-6lowpan-chopan-00.pdf., pp. 1-24, 2009.
J. Schneider, et al., Efficient XML Interchange (EXI) Format 1.0, http://www.w3.org/tr/2009/cr-exi-20091208/, pp. 1-130, 2009.
Hypertext Transfer Protocol, Version HTTP/1.0, http://tools.ietf.org/html/rfc, pp. 1-61, 1996.
T. Bray, "Extensible Markup Language (XML) 1.0 (Fifth Edition)," http://www.w3.org/TR/2008/REC-xml-20081126/, pp. 1-63, 2011.
Simple Object Access Protocol (SOAP), http://www.w3org/TR/soap/, pp. 1-2, 2008.
Korean Office action for related Korean Application No. 10-2014-7006507, dated Aug. 19, 2015, with English Translation.
Canadian Office action for related Canadian Application No. 2,844,569, dated Jun. 5, 2015, with English Translation.
Chinese Office action for related Chinese Application No. 201280039218.7,dated Nov. 20, 2015, with English Translation.

* cited by examiner ection# METHOD AND DEVICE FOR ESTABLISHING AN END-TO-END COMMUNICATION BETWEEN TWO NETWORKS This application is the National Stage of International Application No. PCT/EP2012/064478, filed Jul. 24, 2012, which claims the benefit of European Patent Application No. EP 11177218.2, filed Aug. 11, 2011. The entire contents of both documents are hereby incorporated herein by reference.

BACKGROUND

The present embodiments relate to setting up end-to-end communication between two networks.

Wireless or wired sensor networks are connected to the Internet in order to allow the sensors of the sensor network to be controlled via the Internet from anywhere in the world. In order to connect a sensor network to the Internet, appropriate interfaces are used in order to transmit control commands, data packets and/or messages from the Internet to the sensor network and conversely in order to return response messages, error reports and/or output data from the sensor network to the Internet.

FIG. 1 shows a diagram of a model 10 of communication between two networks. A first network 1 (e.g., the Internet) includes a plurality of nodes that communicate using a first protocol family. In the case of the Internet, this is the Internet protocol family, which uses Transport Control Protocol-/Internet Protocol (TCP/IP) for communication, for example. On a lower communication layer 1a, TCP/IP has Internet protocols such as IPv4 or IPv6, which is responsible for forwarding data packets (routing). On an upper application-specific communication layer 5, transport protocols such as Hypertext Transfer Protocol (HTTP) (see IETF, Hypertext Transfer Protocol, Version HTTP/1.0, RFC 1945, http://tools.ietf.org/html/rfc1945; IETF, Hypertext Transfer Protocol, Version HTTP/1.1, RFC 2616, http://tools.ietf.org/html/rfc2616), which are used for the interchange of data and/or messages via applications 4 that provide services in service-oriented architecture (SOA), for example, are used.

A second network 2 (e.g., a wireless sensor network) may communicate with the first network 1. The second network 2 includes a message path 3 that may be used to interchange messages and/or data between the applications 4 of the first network 1 and proprietary applications 12 of the second network 2. In this case, the second network includes nodes 2a, 2b and 2c, that may have a proprietary routing protocol on a lower communication level. In addition, proprietary transport protocols may be used on an upper communication layer 13, as a result of which direct communication between the applications 4 of the first network 1 and the applications 12 of the second network 2 is not possible.

In order to set up end-to-end communication between the networks 1 and 2, an application gateway 11 may be provided. From an output node in the first network 1, the communication 15 is routed by a first transport protocol (e.g., HTTP) to the application gateway 11, in which the messages and data are converted at application level from the application 4 of the first network 1 into the application 12 of the second network 2. Subsequently, the communication is routed between the application gateway 11 and a node 2a of the second network 2 by the proprietary transport protocol of the second network 2. In the opposite direction, the data or message stream is routed accordingly.

Since the two networks 1 and 2 use different transport protocols from different protocol families, the application gateway 11 converts all desired features and functionalities at application level from one network into the other network. This results in reduced flexibility for such application gateways 11. By way of example, changes in the protocols on one or the other network side require changes in the relevant conversion functions in the application gateway 11. In addition, support for a large number of different applications and protocols is difficult to implement, since each functionality uses precise detailed knowledge of the relevant protocols. Therefore, nonstandardized or provider-specific protocols, for example, are difficult to support.

It is therefore desirable to provide direct communication between applications from different networks. FIG. 2 shows a diagram of a further model 20 of communication between two networks. The model 20 differs from the model 10 essentially in that direct or transparent communication 24 is possible between the applications 4 of the first network 1 and applications 22 of the second network 2. The basic idea of such a model 20 involves matching the transport protocols of the communication layer 5 of the first network 1 to the transport protocols 23 of the second network 2. The semantics of the protocol used (e.g., HTTP) are to be conserved. HTTP is a text-based transport protocol, however, which is unusable for many sensor networks on account of the packet size of the messages and data sent. Therefore, routers 21 that convert the transport protocol used in the first network 1 (e.g., HTTP) into a compressed transport protocol (e.g., compressed HTTP) may be used on an upper communication level. This allows applications 4 and 22 to communicate transparently using HTTP. As a result of this, new applications with new functionality may be incorporated into the networks 1 or 2 without the need for the router 21 to be matched.

More and more web services, for which connection thereof to sensor networks is highly desirable, are used. For communication, web services may use standardized network protocols, such as SOAP. SOAP is a protocol for interchanging messages via a computer network and establishes rules for the message design. For example, SOAP regulates how data in the message are to be depicted and interpreted. SOAP is based for the most part on a standard data protocol such as Extensible Markup Language (XML) in combination with transport protocols such as HTTP and Internet protocols such as IPv4 or IPv6. Although the verbosity and wealth of data of such network protocols may be handled without difficulty by powerful systems such as PCs, laptops or mobile telephones, embedded devices such as microprocessors that may be used in sensor networks are able to manage this volume of data only with considerable runtime losses and with a large memory requirement. Efficient end-to-end communication may not be accomplished with a model as shown in FIG. 2, for example.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method for setting up end-to-end communication between two networks, an apparatus for setting up end-to-end communication between two networks, and a system having an apparatus for setting up end-to-end communication between two networks are provided.

In accordance with one embodiment, a method for setting up end-to-end communication between two networks includes receiving a message from a first network. The message has a first header and an application data portion. The method includes coding data from a first header into a second header within the application data portion using a first coding scheme in order to produce a modified application data portion. The method also includes coding the modified application data portion using a second coding scheme in order to produce a coded message, and sending the coded message to a second network. This method affords the advantage of providing messages that have constituent parts of a plurality of communication protocols using a standard coding in order to keep down the implementation complexity for decoders in the destination network for the message. This advantageously keeps more memory free for application logic. The method according to one or more of the present embodiments affords the advantage of the applications being able to react flexibly to compatibility specifications. For example, a change in the functions of the application data does not require the coding method to be matched.

Advantageously, the method may be used for coding XML messages (see Extensible Markup Language (XML) 1.0 (Fifth Edition), http://www.w3.org/TR/2008/REC-xml-20081126/; SOAP messages, see http://www.w3.org/TR/soap/). In this case, the first header may include HTTP data (see Hypertext Transfer Protocol, Version HTTP/1.0, RFC 1945, http://tools.ietf.org/html/rfc1945; Hypertext Transfer Protocol, Version HTTP/1.1, RFC 2616, http://tools.ietf.org/html/rfc2616) that is converted into a SOAP header for the SOAP message using web service addressing.

Advantageously, the method may code the modified application data portion using a binary coding scheme (e.g., Efficient XML Interchange (EXI); http://www.w3.org/tr/2009/cr-exi-20091208/). This allows a high compression rate, since Efficient XML Interchange (EXI) is not linked to byte sizes.

Advantageously, the method according to one or more of the present embodiments is used for setting up end-to-end communication between network nodes in the Internet and network nodes in a wireless or wired sensor network. This affords the advantage that embedded devices (e.g., sensors) may be integrated into web services better and more easily.

In accordance with a further embodiment, a method for setting up end-to-end communication between two networks includes receiving a coded message from a second network, and decoding the coded message into an application data portion having a second header and application data using a second coding scheme. The method also includes decoding data from the second header into a first header using a first coding scheme, and annexing the first header in front of the application data portion in order to produce a decoded message, and sending the decoded message to a first network. This method affords the advantage of following the method of the first embodiment by appropriately decoding response messages for messages coded in accordance with the method based on the first embodiment and forwarding the messages to the initial network.

In accordance with a further embodiment, an apparatus for setting up end-to-end communication between two networks includes a first transmission/reception device configured to receive a message from a first network. The message has a first header and an application data portion. The apparatus also includes a first coding device configured to code data from the first header into a second header within the application data portion using a first coding scheme to produce a modified application data portion. The apparatus includes a second coding device configured to code the modified application data portion using a second coding scheme into a coded message, and a second transmission/reception device configured to send the coded message to a second network.

In accordance with a further embodiment, an apparatus for setting up end-to-end communication between two networks includes a second transmission/reception device configured to receive a coded message from a second network, and a second decoding device configured to decode data from the coded message into an application data portion having a second header and application data using a second coding scheme. The apparatus includes a first decoding device configured to decode data from the second header into a first header using a first coding scheme, and to annex the first header in front of the application data portion in order to produce a decoded message. The apparatus also includes a first transmission/reception device configured to send the decoded message to a first network.

In accordance with a further embodiment, a system includes an apparatus based on one of the embodiments cited above. The system includes a first network node in the first network and a second network node in the second network. The first network node is connected to one of the transmission/reception devices, and the second network node is connected to the other of the transmission/reception devices.

DETAILED DESCRIPTION

Figure 1:
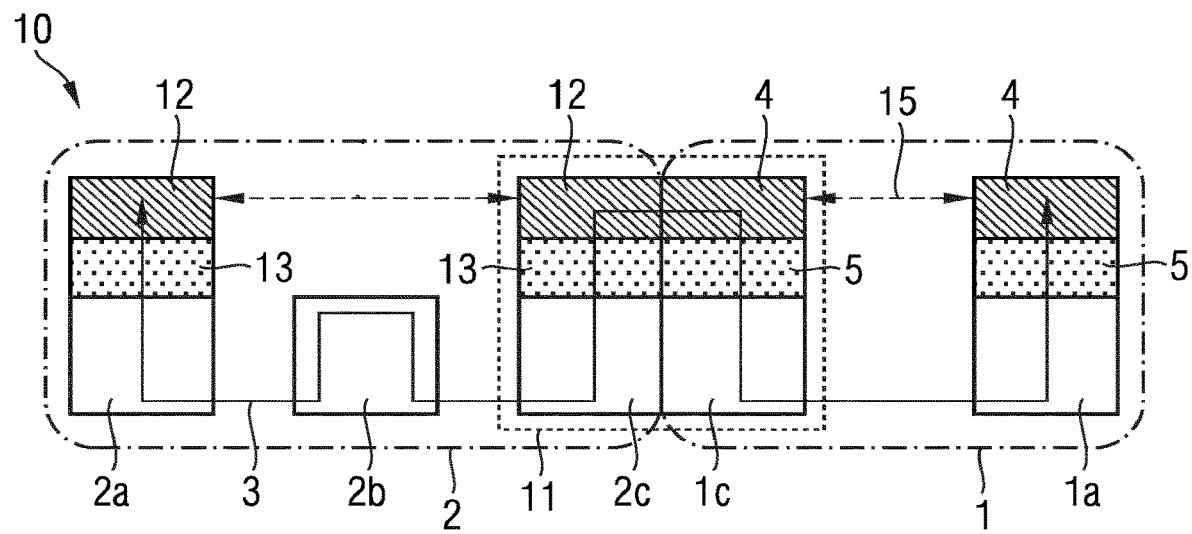
FIG. 1 shows a diagram of a model of communication between two networks.
Figure 2:
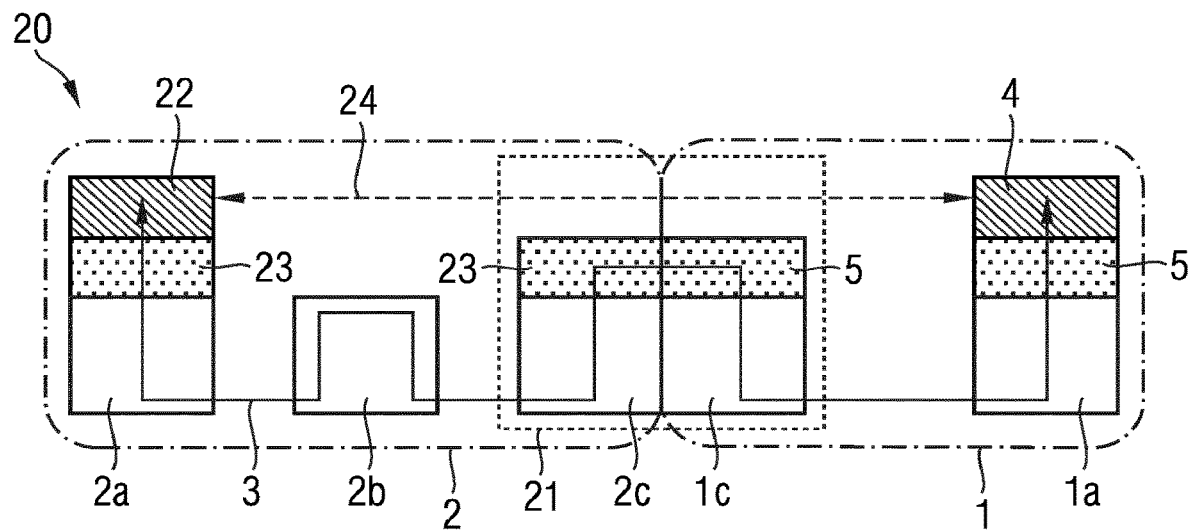
FIG. 2 shows a diagram of a further model of communication between two networks.

Elements in the figures that are of the same type and/or have the same effect are provided with the same reference symbols. The specified illustrations are not necessarily to scale. In addition, single features and/or concepts of various embodiments shown in the drawings may be combined with one another in any way, if appropriate.

Figure 3:
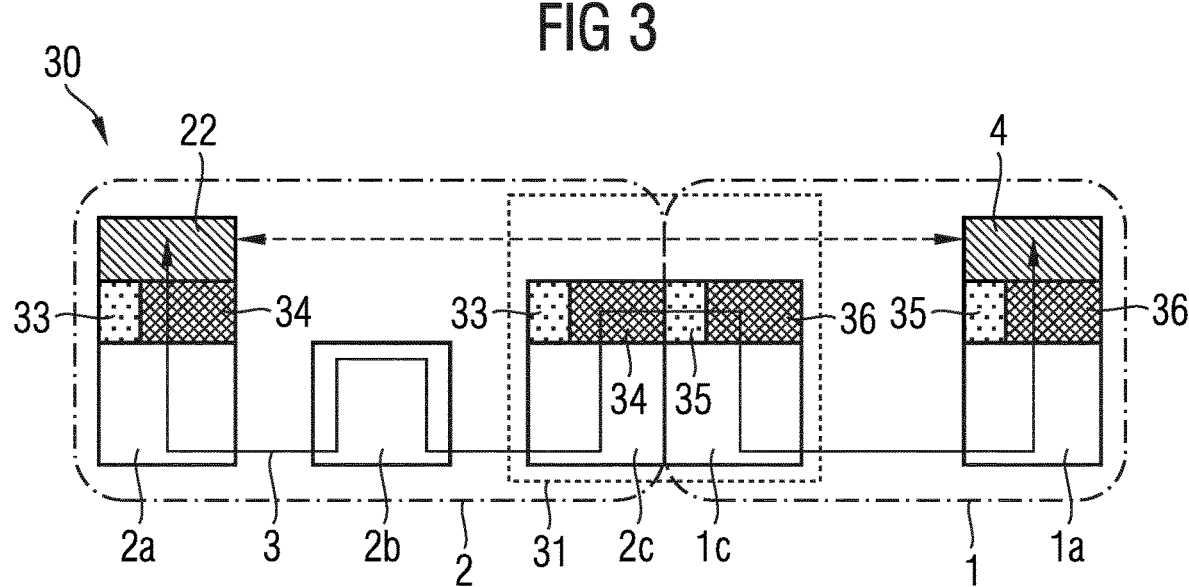
FIG. 3 shows a diagram of yet another model of communication between two networks.
Figure 6A:
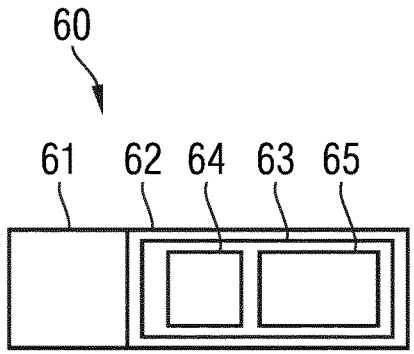
FIG. 6a shows an illustration of an example of an uncoded message.

FIG. 3 shows a diagram of an exemplary model 30 of communication between two networks. The model 30 differs from the model 20 in that a conversion apparatus 31 is used that converts data packets and/or messages from a first network 1 (e.g., the Internet) for forwarding to a second network 2 (e.g., a sensor network). As shown in FIG. 6a, such messages or data packets 60 include a header 61 that contains details of the transport protocol used (e.g., HTTP; see IETF, Hypertext Transfer Protocol, Version HTTP/1.0, RFC 1945, http://tools.ietf.org/html/rfc1945, and IETF, Hypertext Transfer Protocol, Version HTTP/1.1, RFC 2616, http://tools.ietf.org/html/rfc2616). An application data portion 62 of the data packet 60 includes details of the respective data interchange protocol used. By way of example, the application data portion 62 may include a SOAP message 63 (see http://www.w3.org/TR/soap/). SOAP messages 63 may include a frame construct (e.g., an "envelope") that has an embedded body element (e.g., a "SOAP body" 65). In this case, the SOAP body 65 includes the useful data on which the SOAP message 63 is based. The useful data is generated by the application 4. Optionally, a SOAP message 63 may also include a dedicated header 64 (e.g., "SOAP header") that may include further information relating to the processing of the SOAP message 63, such as routing information, encryption data or authentication data.

In accordance with the model 30, the conversion apparatus 31 is used to convert a header 35 of a data packet 60, which may correspond to the header 61, into a coded header 33. The conversion apparatus 31 is also used to convert an application data portion 36, which may correspond to the application data portion 62 of the data packet 60, into a coded application data portion 34 in accordance with the model 30. The coded header 33 and the coded application data portion 34 are then compiled to form a coded data packet and transferred to the second network 2, where an application 22 may decode and read the coded constituent parts 33 and 34 as appropriate.

Figure 6B:
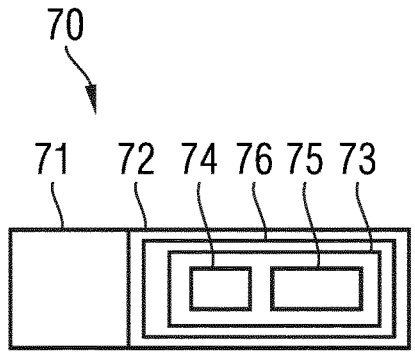
FIG. 6b shows an illustration of an example of a coded message.

A coded data packet of this kind may have a structure like a data packet 70 in FIG. 6b, for example. The coded data packet 70 includes a coded header 71 that may be produced by coding a header 61 in FIG. 6a, for example. The coding of the header 61 into a coded header 71 may be performed using compressed HTTP over personal area networks (Chopan), for example (see http://tools.ietf.org/pdf/draft-frank-6lowpan-chopan-00.pdf). Chopan is a compression method for HTTP into binary format. A coded application data portion 72 of the data packet 70 may be produced from an application data portion 62 of a data packet 60 in FIG. 6a, for example. The coded application data portion 72 may include a data portion 76, for example, in efficient XML interchange (EXI) format (see http://www.w3.org/tr/2009/cr-exi-20091208/), which may be used to code a SOAP message 73 having a SOAP header 74 and a SOAP body 75. EXI is binary coding of text-based extensible markup language (XML) documents (see http://www.w3.org/TR/2008/REC-xml-20081126/) and uses entropy-based coding schemes. The data portion 76 may also be coded in the binary MPEG format for XML (BiM) (see MPEG Systems Technologies—Part 1: Binary MPEG format for XML, ISO/IEC FDIS 23001-1:2005 (E), ISO/IEC JTC 1/SC 29/WG11, w7597, Nov. 4, 2005). BiM is an international standard for generic binary coding of XML data.

The conversion of the compressed and coded data components 33 and 34 into decoded messages or data packets that may be read by the application 22 of the second network 2 uses two decoders that decode the respective protocols. These decoders are implemented in the processing appliance of the second network 2 (e.g., a microprocessor of a sensor in a sensor network).

Figure 4:
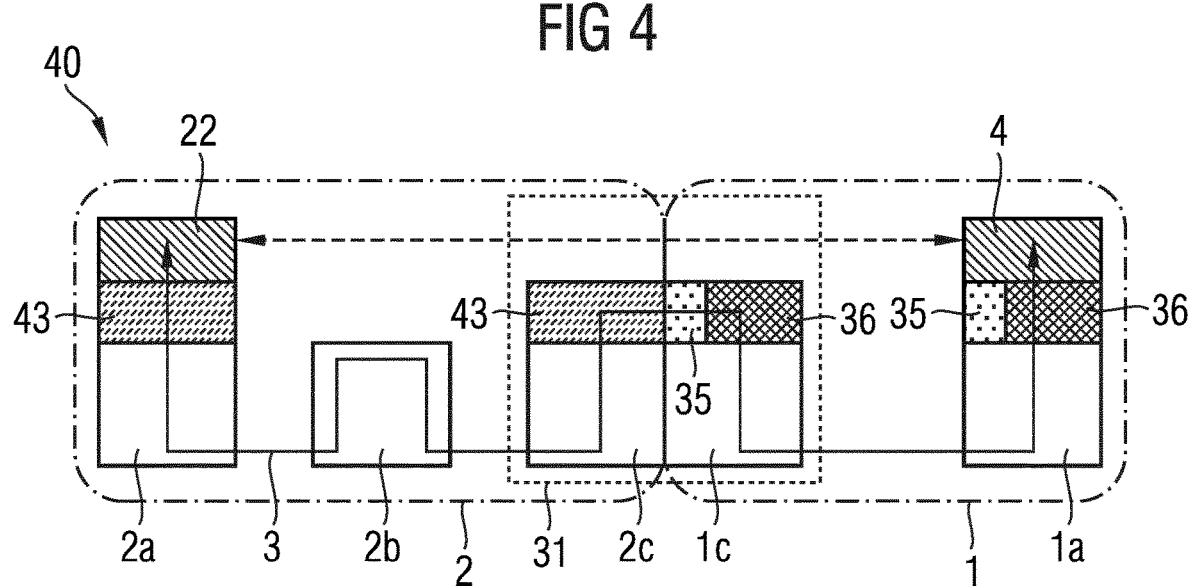
FIG. 4 shows a diagram of a model of communication between two networks in accordance with an embodiment.

FIG. 4 shows a diagram of a model 40 of communication between two networks in accordance with an embodiment. The model 40 differs from the model 30 essentially in that a data packet or a message having a header 35 and an application data portion 36 that is received from a first network 1, such as the Internet, is converted into a coded data packet or a coded message 43 in an apparatus 31. In this case, the coded message 43 may correspond to a coded message 80, as shown in FIG. 6c.

Figure 6C:
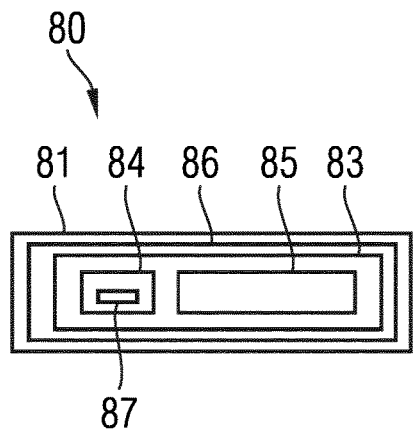
FIG. 6c shows an illustration of a coded message in accordance with an embodiment.

In this case, the coded message 80 in FIG. 6c includes a coded component 81 that incorporates a header, such as a header 61 (e.g., an HTTP header) into a coded application data component 81. The coded application data component 81 may include a component 86 that is coded using a binary coding scheme (e.g., using EXI). The component 86 may include a modified application data component 83 (e.g., a SOAP message 83) that may correspond to the SOAP message 63 of the data packet 60 in FIG. 6a. The SOAP message 83 may include a SOAP header 84 and a soap body 85, similar to the SOAP header 64 and the SOAP body 65 in FIG. 6a. The SOAP header 84 has a component 87 that includes coded data from the header 61. The component 87 may have been coded using web service addressing (WS addressing). WS addressing is the specification of a mechanism that allows web services to interchange address information. In this case, a data structure for the transfer of a reference to a web service terminal point and a set of address properties of messages that combine address information with a particular message are provided. WS addressing is part of the WS specifications that have been developed as a modular extension for SOAP. The component 87 may be used to code information that is existent in the HTTP portion of the header 61 as transport information.

In this way, the message or the data packet 61, which includes a header 61 (e.g., an HTTP header) and an application data component 62 (e.g., a SOAP message) may be coded in standard fashion using a single first coding scheme. This coding scheme may be EXI or BiM, for example. The header 61 is converted into the application data component 62 (e.g., a SOAP header 64) using a second coding scheme (e.g., WS addressing), so that the application data portion 62 may then be coded into a coded message 80 in standard fashion.

This has the advantage that a network node 2a in which a microprocessor decodes the coded message 43 for an application 22 (e.g., a sensor in a sensor network) now uses only a single decoder (e.g., an EXI coder or a BiM coder). This provides that less computation capacity and storage space is used in the microprocessor, which then has more computation power and storage space available for other operations. A further advantage of the use of EXI is a high compression rate and the associated bandwidth saving when the coded message is transmitted in the second network 2, since EXI is not linked to byte sizes.

Despite compression with EXI, compatibility with HTTP is maintained, which provides that the method according to one or more of the present embodiments is very well suited to the implementation of new products that nevertheless remain compatible with older products.

Figure 5:
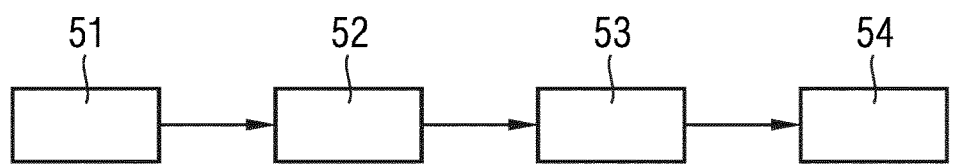
FIG. 5 shows a scheme for a method for setting up end-to-end communication between two networks in accordance with an embodiment.

FIG. 5 shows a scheme for a method for setting up end-to-end communication between two networks in accordance with an embodiment. In act 51, a message is received from a first network. The message has a first header and an application data portion. In this case, the first network may be the Internet, and the message may include HTTP data in the header and a SOAP message in the application data portion.

In act 52, data from the first header is coded into a second header within the application data portion using a first coding scheme in order to produce a modified application data portion. In this case, the second header may be a SOAP header, of a SOAP message. In the second header, a data component that includes HTTP data for an HTTP header is produced using web service (WS) addressing (see www.w3c.org).

In act 53, the modified application data portion is coded using a second coding scheme in order to produce a coded message. In this case, the second coding scheme may be a binary coding scheme (e.g., EXI or BiM), which is used to code a SOAP message. In act 54, the coded message is sent to a second network. In this case, the second network may, for example, be a sensor network (e.g., an industrial sensor network, a sensor network in buildings engineering or the like).

In accordance with a further embodiment, a method for setting up end-to-end communication between two networks that represents the inverse of the method presented above in reference to FIG. 5 is provided. In this case, a coded message may be received from a network (e.g., a sensor network), the coded message may be decoded into an application data portion having a first header and application data using a first coding scheme (e.g., EXI), the data from the first header may be decoded into a second header using a second coding scheme (e.g., WS addressing), the second header may be annexed in front of the application data portion in order to produce a decoded message (e.g., having an HTTP header and a SOAP message), and the decoded message may be sent to a second network (e.g., the Internet).

Figure 7:
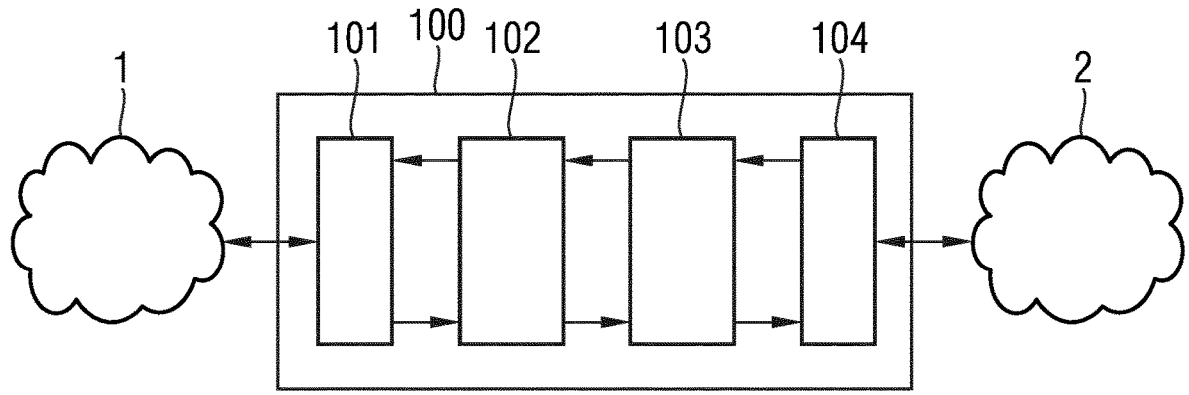
FIG. 7 shows a schematic illustration of an apparatus for setting up end-to-end communication between two networks in accordance with an embodiment.

FIG. 7 shows a schematic illustration of an apparatus 100 for setting up end-to-end communication between two networks in accordance with an embodiment. In this case, the apparatus 100 includes a first transmission/reception device 101 configured to receive a message from a first network 1. The message has a first header and an application data portion. The apparatus 100 also includes a first coding device 102 configured to code data from the first header into a second header within the application data portion using a first coding scheme to produce a modified application data portion. The apparatus 100 includes a second coding device 103 configured to code the modified application data portion using a second coding scheme into a coded message. The apparatus 100 also includes a second transmission/reception device 104 configured to send the coded message to a second network 2. In this case, the apparatus 100 may perform a method as shown in FIG. 5. It is clear to a person skilled in the art that the first coding device 102 and the second coding device 103 may also be in the form of a single coding device having the functionalities of the coding devices 102 and 103.

In accordance with a further embodiment, an apparatus for setting up end-to-end communication between two networks is provided that includes a first transmission/reception device configured to receive a coded message from a first network, a first decoding device configured to decode data from the coded message into an application data portion having a first header and application data using a first coding scheme. The apparatus also includes a second decoding device configured to decode data from the first header into a second header using a second coding scheme, and to annex the second header in front of the application data portion in order to produce a decoded message. The apparatus includes a second transmission/reception device configured to send the decoded message to a second network. In this case, the apparatus may be of similar design to the apparatus 100 in FIG. 7. For example, the devices 101, 102, 103 and 104 may be configured to forward messages or data packets in both directions (e.g., from the first to the second network and vice versa, and in this case, to perform the relevant coding and decoding steps. The first decoding device and the second decoding device may also be in the form of a single decoding device having the functionalities of the first and second decoding devices.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for setting up end-to-end communication between two networks, the method comprising:
   receiving a message from a first network, wherein the message includes a first header, an application data portion, and a second header within the application data portion of the message, wherein the application data portion comprises XML data and a SOAP message, wherein the first header comprises HTTP data, and wherein the second header is a SOAP header;
   generating a third header, the generating comprising:
      coding data from the first header into the second header within the application data portion of the message using a first coding scheme in order to produce a modified application data portion including the first header and the second header;
   coding the modified application data portion using a second coding scheme in order to produce a coded message, the second coding scheme being different than the first coding scheme; and
   sending the coded message to a second network.

2. A method for setting up end-to-end communication between two networks, the method comprising:
   receiving a coded message from a first network;
   decoding the coded message into an application data portion including a first header and application data using a first coding scheme, the first header including information from a second header, wherein the application data portion comprises XML data and a SOAP message, wherein the first header comprises HTTP data, and wherein the second header is a SOAP header;
   decoding data from the second header of the application data portion into a third header using a second coding scheme, the second coding scheme being different than the first coding scheme;
   annexing the third header in front of the application data portion in order to produce a decoded message; and
   sending the decoded message to a second network.

3. The method of claim 1, wherein the first coding scheme comprises web services addressing.

4. The method of claim 1, wherein the second coding scheme is Efficient XML Interchange or binary MPEG format for XML.

5. The method of claim 1, wherein the first network is the Internet.

6. The method of claim 1, wherein the second network is a sensor network.

7. An apparatus for setting up end-to-end communication between two networks, the apparatus comprising:
- a first transmission/reception device configured to receive a message from a first network, wherein the message includes a first header, an application data portion, and a second header within the application data portion of the message;
- a first coding device configured to generate a third header, the generation of the third header comprising coding data from the first header into the second header within the application data portion of the message using a first coding scheme to produce a modified application data portion including the first header and the second header, wherein the first coding scheme comprises web services addressing;
- a second coding device configured to code the modified application data portion using a second coding scheme into a coded message, wherein the second coding scheme is Efficient XML Interchange or binary MPEG format for XML; and
- a second transmission/reception device configured to send the coded message to a second network.

8. An apparatus for setting up end-to-end communication between two networks, the apparatus comprising:
- a first transmission/reception device configured to receive a coded message from a first network;
- a first decoding device configured to decode data from the coded message into an application data portion including a first header and application data using a first coding scheme, the first header including information from a second header, wherein the first coding scheme comprises web services addressing;
- a second decoding device configured to decode data from the second header of the application data portion into a third header using a second coding scheme and to annex the third header in front of the application data portion in order to produce a decoded message, wherein the second coding scheme is Efficient XML Interchange or binary MPEG format for XML; and
- a second transmission/reception device configured to send the decoded message to a second network.

9. A system comprising:
an apparatus for setting up end-to-end communication between two networks, the apparatus comprising:
- a first transmission/reception device configured to receive a message from a first network, wherein the message includes a first header, an application data portion, and a second header within the application data portion of the message, wherein the application data portion comprises XML data and a SOAP message, wherein the first header comprises HTTP data, and wherein the second header is a SOAP header;
- a first coding device configured to generate a third header, the generation of the third header comprising coding data from the first header into the second header within the application data portion of the message using a first coding scheme to produce a modified application data portion including the first header and the second header;
- a second coding device configured to code the modified application data portion using a second coding scheme into a coded message, the second coding scheme being different than the first coding scheme; and
- a second transmission/reception device configured to send the coded message to a second network;
- a network node in the first network, the network node being connected to one transmission/reception device of the first transmission/reception device and the second transmission/reception device; and
- a network node in the second network, the network node being connected to the other transmission/reception device of the first transmission/reception device and the second transmission/reception device.

10. The method of claim 2, wherein the second coding scheme comprises web services addressing.

11. The method of claim 2, wherein the first coding scheme is Efficient XML Interchange or binary MPEG format for XML.

12. The method of claim 2, wherein the second network is the Internet.

* * * * *